March 20, 1934.  E. F. PASHLEY  1,951,626
ARTIFICIAL BAIT
Filed April 15, 1932
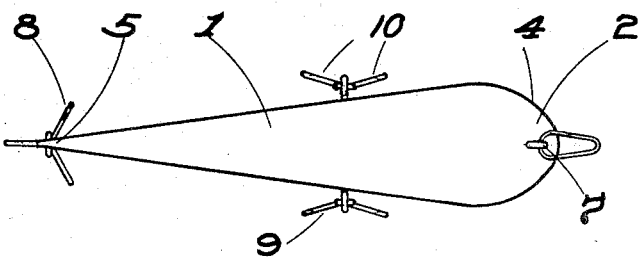
FIG. 1
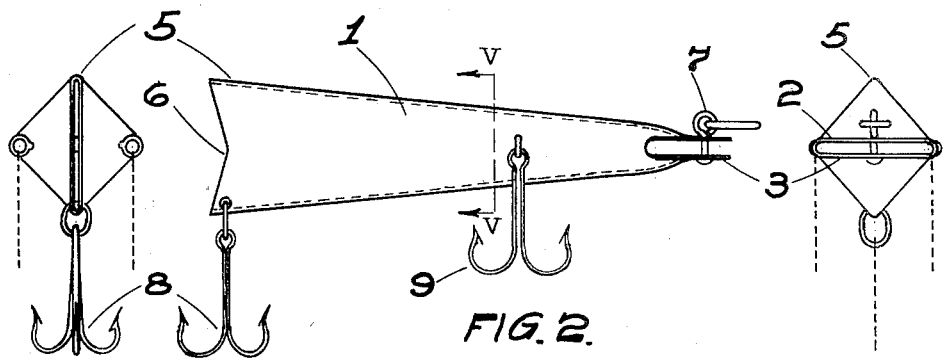
FIG. 2
FIG. 3.  FIG. 4.
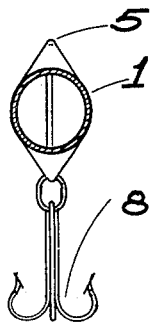
FIG. 5.
INVENTOR
EMIL F. PASHLEY
BY
Edward R. Inman
ATTORNEY Patented Mar. 20, 1934

1,951,626

UNITED STATES PATENT OFFICE 1,951,626

ARTIFICIAL BAIT

Emil F. Pashley, Lakewood, Ohio

Application April 15, 1932, Serial No. 605,442

4 Claims. (Cl. 43—46)

The object of this invention is, to provide an artificial bait that is formed from metallic tubing, whereby a bait is produced of highly alluring character which can withstand hard usage and is comparatively inexpensive to manufacture.

In the drawing:

Fig. 1 is a top or plan view;

Fig. 2 is a side view or elevation;

Figs. 3 and 4 are end views of the respectively adjacent ends of Fig. 2;

Fig. 5 is a transverse section on line v—v of Fig. 2.

The form of bait shown in the drawing is produced in the following manner:

A piece of tubing composed of fairly soft metal is cut to the length which is desired for the lure or body 1, and if the bait is to be made in a form having the semblance of a minnow, one end of the tube is flattened to form the head end of said body; the outer edge of the jaws 2, 3 are shaped to a form which is substantially a semicircle, as shown at 4; the other or tail end 5 of the tube is flattened so that its major axis or width extends transversely to the major axis or width of the jaws; the end of the tail at 6 may be formed to the conventional fish tail shape.

The front end or head of the lure, bait or body is provided with suitable means, as an eye 7, for attachment to a line.

Hooks as 8, 9, 10 are secured to the body in any desired manner.

With reference to tubular material or stock from which the bait is formed, said stock retains its original tubular form at or about the point indicated by the dotted, transverse line v—v, at which point the section Fig. 5 is taken.

I claim the following:

1. An artificial bait formed from tubing which is cylindrical throughout its length, the formation of which is such as to cause said tubing to have the semblance of a minnow; one end of said tubing being provided with a flattened portion to form the head and the other end being provided with a flattened portion to form the tail.

2. An artificial bait consisting of a thin walled, elongated hollow structure having at and adjacent the longitudinal central portion thereof a cylindrical form wherefrom said walls extend in opposite directions to finally assume a flattened, closely spaced, parallel relation such that, at the ends thereof the edges of said walls define an elongated, narrow slot, said edges being formed into the semblance of the head and the tail, respectively of a minnow.

3. An artificial bait consisting of a thin walled, elongated, hollow structure which has at and adjacent the central portion thereof a cylindrical shape wherefrom said walls extend in opposite directions to assume a flattened form and converging relation such that, at their termini, they are in narrowly spaced, parallel relation and define elongated narrow slots, respectively, the edges of said slots having the semblance of the head and the tail of a minnow.

4. An artificial bait consisting of a thin walled, elongated hollow structure which has, at and adjacent the longitudinal central portion thereof, a cylindrical form, said walls at and adjacent the ends of said structure being disposed in closely spaced, parallel relation such that the terminal edges of said walls respectively define narrow slots which extend in relatively transverse relation, the ends of said structure being formed to impart thereto and to said structure the semblance of a minnow.

EMIL F. PASHLEY.